(12) United States Patent
Hsieh et al.

(10) Patent No.: US 9,984,476 B2
(45) Date of Patent: *May 29, 2018

(54) METHODS AND SYSTEMS FOR AUTOMATIC SEGMENTATION

(71) Applicant: General Electric Company, Schenectady, NY (US)

(72) Inventors: Jiang Hsieh, Brookfield, WI (US); William David Doan, Frisco, TX (US); Paul Roger Anderson, Bloomfield Hills, MI (US)

(73) Assignee: General Electric Company, Schenectady, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/715,373

(22) Filed: May 18, 2015

(65) Prior Publication Data

US 2016/0292878 A1  Oct. 6, 2016

Related U.S. Application Data

(63) Continuation-in-part of application No. 14/673,650, filed on Mar. 30, 2015.

(51) Int. Cl.
G06K 9/34 (2006.01)
G06T 11/00 (2006.01)
G06T 7/174 (2017.01)

(52) U.S. Cl.
CPC .......... *G06T 11/001* (2013.01); *G06T 7/174* (2017.01); *G06T 11/003* (2013.01); *G06T 2207/10081* (2013.01); *G06T 2207/30004* (2013.01)

(58) Field of Classification Search
CPC .......... G06T 11/001; G06T 11/003; G06T 2207/10081; G06T 7/174
See application file for complete search history.

(56) References Cited

U.S. PATENT DOCUMENTS 8,023,767 B1* 9/2011 Ning ............... A61B 6/032 382/128
2007/0116343 A1* 5/2007 Sauer ............... G06T 5/50 382/131

(Continued)

OTHER PUBLICATIONS

Hsieh, J. et al., "An Efficient Iterative Reconstruction Algorithm for CT Dose Reduction," Abstract Archives of the RSNA, Radiological Society of North America 2009 Scientific Assembly and Annual Meeting: SSQ18: Physics (Image Reconstruction II), SSQ18-07, Dec. 3, 2009, Available Online at http://archive.rsna.org/2009/8005566.html, 2 pages.

(Continued)

*Primary Examiner* — Phuoc Tran
(74) *Attorney, Agent, or Firm* — McCoy Russell LLP

(57) ABSTRACT

Methods and systems are provided for reconstructing and automatically segmenting an image. In one embodiment, a method comprises acquiring projection data, the projection data comprising higher energy projection data and lower energy projection data, generating a first image from the projection data, generating a second image from the projection data, segmenting the second image to generate segments, and segmenting the first image based on the segments of the second image. In this way, an image which may otherwise prove challenging for an automatic segmentation process may be accurately segmented without sacrificing textural details of the image.

20 Claims, 5 Drawing Sheets

(56) References Cited

U.S. PATENT DOCUMENTS

2013/0004041 A1* 1/2013 Yang ................. G06K 9/40
                                               382/131
2016/0247279 A1* 8/2016 Lavi .................. G06F 19/3431

OTHER PUBLICATIONS

Campadelli, P. et al., "Automatic Liver Segmentation from Abdominal CT Scans," 14th International Conference on Image Analysis and Processing, Sep. 10, 2007, 6 pages.

Thibault, J. et al., "A Three-Dimensional Statistical Approach to Improved Image Quality for Multislice Helical CT," Medical Physics, vol. 34, No. 11, Nov. 2007, 19 pages.

Moghe, A. et al., "Automatic Threshold Based Liver Lesion Segmentation in Abdominal 2D-CT Images," International Journal of Image Processing, vol. 5, No. 2, May 2011, 11 pages.

\* cited by examiner

METHODS AND SYSTEMS FOR AUTOMATIC SEGMENTATION

CROSS REFERENCE TO RELATED APPLICATIONS

The present application is a continuation-in-part of U.S. Non-Provisional application Ser. No. 14/673,650 entitled "METHODS AND SYSTEMS FOR AUTOMATIC SEGMENTATION," and filed on Mar. 30, 2015, which is hereby incorporated by reference in its entirety for all purposes.

FIELD

Embodiments of the subject matter disclosed herein relate to non-invasive diagnostic imaging, and more particularly, to automatic segmentation of diagnostic images.

BACKGROUND

Non-invasive imaging technologies allow images of the internal structures of a patient or object to be obtained without performing an invasive procedure on the patient or object. In particular, technologies such as computed tomography (CT) use various physical principals, such as the differential transmission of x-rays through the target volume, to acquire image data and to construct tomographic images (e.g., three-dimensional representations of the interior of the human body or of other imaged structures).

One of the key tasks in oncology is to automatically perform segmentation of reconstructed images to identify organs and other anatomical structures. Unfortunately, many segmentation algorithms are often distracted by the presence of noise and fail to identify correct organ boundaries. For example, since the invention of CT, filtered backprojection (FBP) has been used almost exclusively for image reconstruction because of its computational efficiency. However, one disadvantage of FBP is its suboptimal noise and image quality performance resulting from simplifications made in order to derive the closed form analytic solution. In contrast, iterative reconstruction (IR) algorithms feature substantially reduced noise levels in reconstructed images compared to FBP reconstructed images of the same scanning data. However, IR is still too noisy for automatic segmentation of images due to variations in intensity within anatomical structures in the image. The difficulty is further enhanced by the organ variations from patient to patient. A more reliable and automated organ segmentation is highly desirable for workflow and productivity.

BRIEF DESCRIPTION

In one embodiment, a method comprises acquiring projection data, the projection data comprising higher energy projection data and lower energy projection data, generating a first image from the lower energy projection data, generating a second image from the higher energy projection data, segmenting the second image to generate segments, and segmenting the first image based on the segments of the second image. In this way, an image which may otherwise prove challenging for an automatic segmentation process may be accurately segmented without sacrificing textural details of the image.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 4:
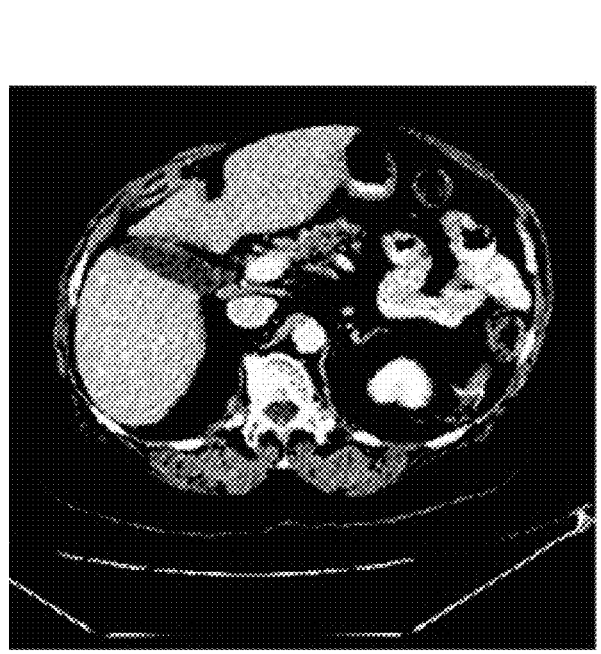
FIG. 4 shows an example image reconstructed with a normal iterative reconstruction algorithm according to an embodiment of the invention.
Figure 5:
FIG. 5 shows an example image reconstructed with a modified iterative reconstruction algorithm according to an embodiment of the invention.

The following description relates to various embodiments of medical imaging systems. In particular, methods and systems are provided for reconstructing an image with ideal properties for automatic segmentation. An example of a computed tomography (CT) imaging system that may be used to acquire images processed in accordance with the present techniques is provided in FIGS. 1 and 2. A method for automatic segmentation, such as the method shown in FIG. 3, may include reconstructing a first image suitable for diagnostics and a second image suitable for segmentation, and the first image may be segmented based on the segmentation of the second image. FIGS. 4 and 5 show example image reconstructions suitable for diagnostics and segmentation, respectively. When the segmentation of an image takes significant priority over the textural details of an image, a method for automatic segmentation, such as the method shown in FIG. 6, may include reconstructing an image suitable for segmentation and outputting the image after segmentation, rather than applying the segments to a second image. In some examples, dual or multi-energy imaging may enable reconstruction of images at different acquisition energy levels. In such examples, a method for automatic segmentation, such as the method shown in FIG. 7, may include segmenting an image corresponding to a first acquisition energy and then porting the segmentation to an image corresponding to a second acquisition energy.

Though a CT system is described by way of example, it should be understood that the present techniques may also be useful when applied to images acquired using other imaging modalities, such as tomosynthesis, MRI, C-arm angiography, and so forth. The present discussion of a CT imaging modality is provided merely as an example of one suitable imaging modality.

Figure 1:
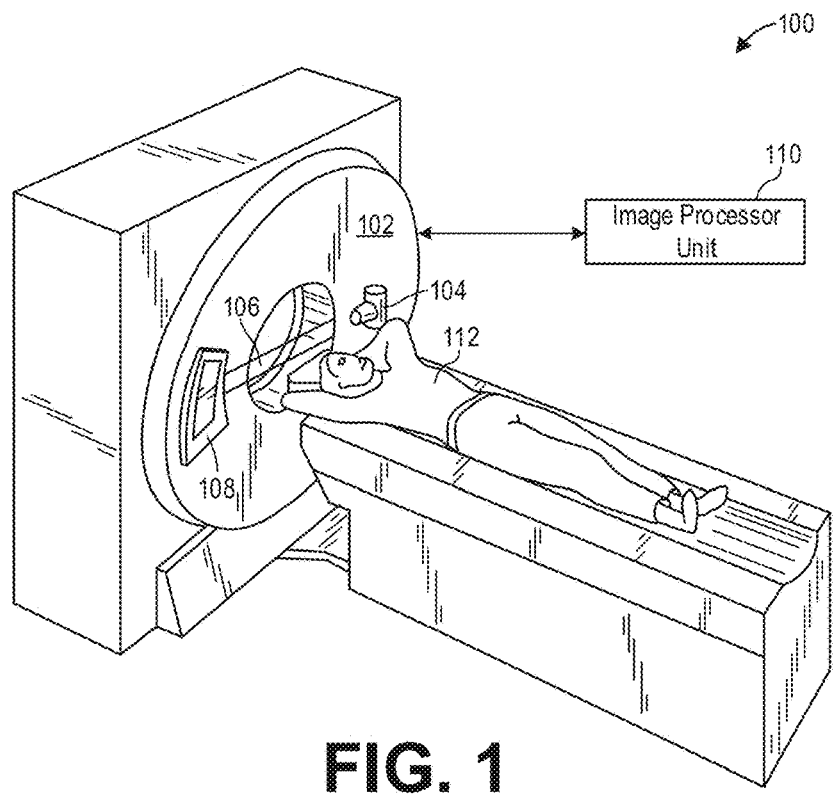
FIG. 1 shows a pictorial view of an imaging system according to an embodiment of the invention.

FIG. 1 illustrates an exemplary CT system 100 configured to allow fast and iterative image reconstruction. Particularly, the CT system 100 is configured to image a subject such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray radiation source 104 configured to project a beam of x-ray radiation 106 for use in imaging the patient. Specifically, the radiation source 104 is configured to project the x-rays 106 towards a detector array 108 positioned on the opposite side of the gantry 102. Although FIG. 1 depicts only a single radiation source 104, in certain embodiments, multiple radiation sources may be employed to project a plurality of x-rays 106 for acquiring projection data corresponding to the patient at different energy levels.

In certain embodiments, the CT system 100 further includes an image processing unit 110 configured to reconstruct images of a target volume of the patient using an iterative or analytic image reconstruction method. For example, the image processing unit 110 may use an analytic image reconstruction approach such as filtered backprojection (FBP) to reconstruct images of a target volume of the patient. As another example, the image processing unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the patient.

Figure 2:
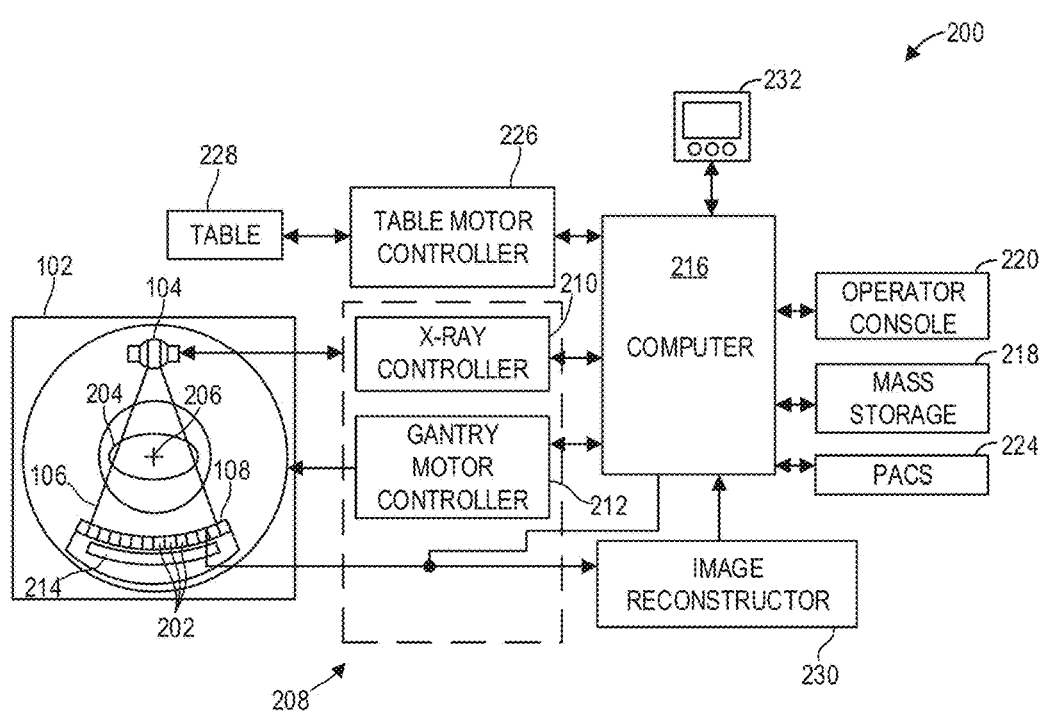
FIG. 2 shows a block schematic diagram of an exemplary imaging system according to an embodiment of the invention.

FIG. 2 illustrates an exemplary imaging system 200 similar to the CT system 100 of FIG. 1. In accordance with aspects of the present disclosure, the system 200 is configured to reconstruct images with a user-specified temporal window in real-time. In one embodiment, the system 200 includes the detector array 108 (see FIG. 1). The detector array 108 further includes a plurality of detector elements 202 that together sense the x-ray beams 106 (see FIG. 1) that pass through a subject 204 such as a patient to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

In one embodiment, the system 200 includes a control mechanism 208 to control movement of the components such as rotation of the gantry 102 and the operation of the x-ray radiation source 104. In certain embodiments, the control mechanism 208 further includes an x-ray controller 210 configured to provide power and timing signals to the radiation source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The data sampled and digitized by the DAS 214 is transmitted to a computing device 216. In one example, the computing device 216 stores the data in a storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage device.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the system 200, for example, for inputting or outputting system parameters, requesting examinations, and/or viewing images. Further, in certain embodiments, the system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks.

In one embodiment, for example, the system 200 either includes, or is coupled to a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a motorized table 228. Particularly, the table motor controller 226 moves the table 228 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the system 200 and instead the computing device 216 may perform one or more functions of the image reconstructor 230. Moreover, the image reconstructor 230 may be located locally or remotely, and may be operatively connected to the system 100 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 transmits the reconstructed images to the computing device 216 for generating useful patient information for diagnosis and evaluation. In certain embodiments, the computing device 216 transmits the reconstructed images and/or the patient information to a display 232 communicatively coupled to the computing device 216 and/or the image reconstructor 230.

In one embodiment, the display 232 allows the operator to evaluate the imaged anatomy. The display 232 may also allow the operator to select a volume of interest (VOI) and/or request patient information, for example, via graphical user interface (GUI) for a subsequent scan or processing.

In some embodiments, the CT system 200 may be configured for dual or multi-energy imaging. In dual or multi-energy imaging, two or more sets of projection data are typically obtained for the imaged object at different tube peak kilovoltage (kVp) levels, which change the peak and spectrum of energy of the incident photons comprising the emitted x-ray beams or, alternatively, at a single tube peak kilovoltage (kVp) level or spectrum with an energy resolving detector of the detector array 108. Regarding terminology, a set of projection data obtained at a higher tube kVp level may be interchangeably referred to herein as a high kVp dataset or a high energy dataset, while a set of projection data obtained at a lower tube kVp level may be interchangeably referred to herein as a low kVp dataset or a low energy dataset.

The acquired sets of projection data may be used for basis material decomposition (BMD). During BMD, the measured projections are converted to a set of density line-integral projections. The density line-integral projections may be reconstructed to form a density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the CT system 200 reveals internal features of the patient 204, expressed in the densities of the two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In addition to a CT number or Hounsfield value, an energy selective CT system can provide additional information related to a material's atomic number and density. This information may be particularly useful for a number of medical clinical applications, where the CT number of different materials may be similar but the atomic number may be quite different. For example, calcified plaque and iodine-contrast enhanced blood may be located together in coronary arteries or other vessels. As will be appreciated by those skilled in the art, calcified plaque and iodine-contrast enhanced blood are known have distinctly different atomic numbers, but at certain densities these two materials are indistinguishable by CT number alone.

A decomposition algorithm is employable to generate atomic number and density information from energy sensitive x-ray measurements. Multiple energy techniques comprise dual energy, photon counting energy discrimination, dual layered scintillation and/or one or more other techniques designed to measure x-ray attenuation in two or more distinct energy ranges. As an example, a compound or mixture of materials measured with a multiple energy technique may be represented as a hypothetical material having the same x-ray energy attenuation characteristics. This hypothetical material can be assigned an effective atomic number Z. Unlike the atomic number of an element, effective atomic number of a compound is defined by the x-ray attenuation characteristics, and it needs not be an integer. This effective Z representation property stems from a well-known fact that x-ray attenuation in the energy range useful for diagnostic x-ray imaging is strongly related to the electron density of compounds, which is also related to the atomic number of materials.

The various methods and processes described further herein may be stored as executable instructions in non-transitory memory on a computing device in system 200. In one embodiment, image reconstructor 230 may include such instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216. Example methods and processes are described further herein and with regard to FIGS. 3, 6, and 7.

Figure 3:
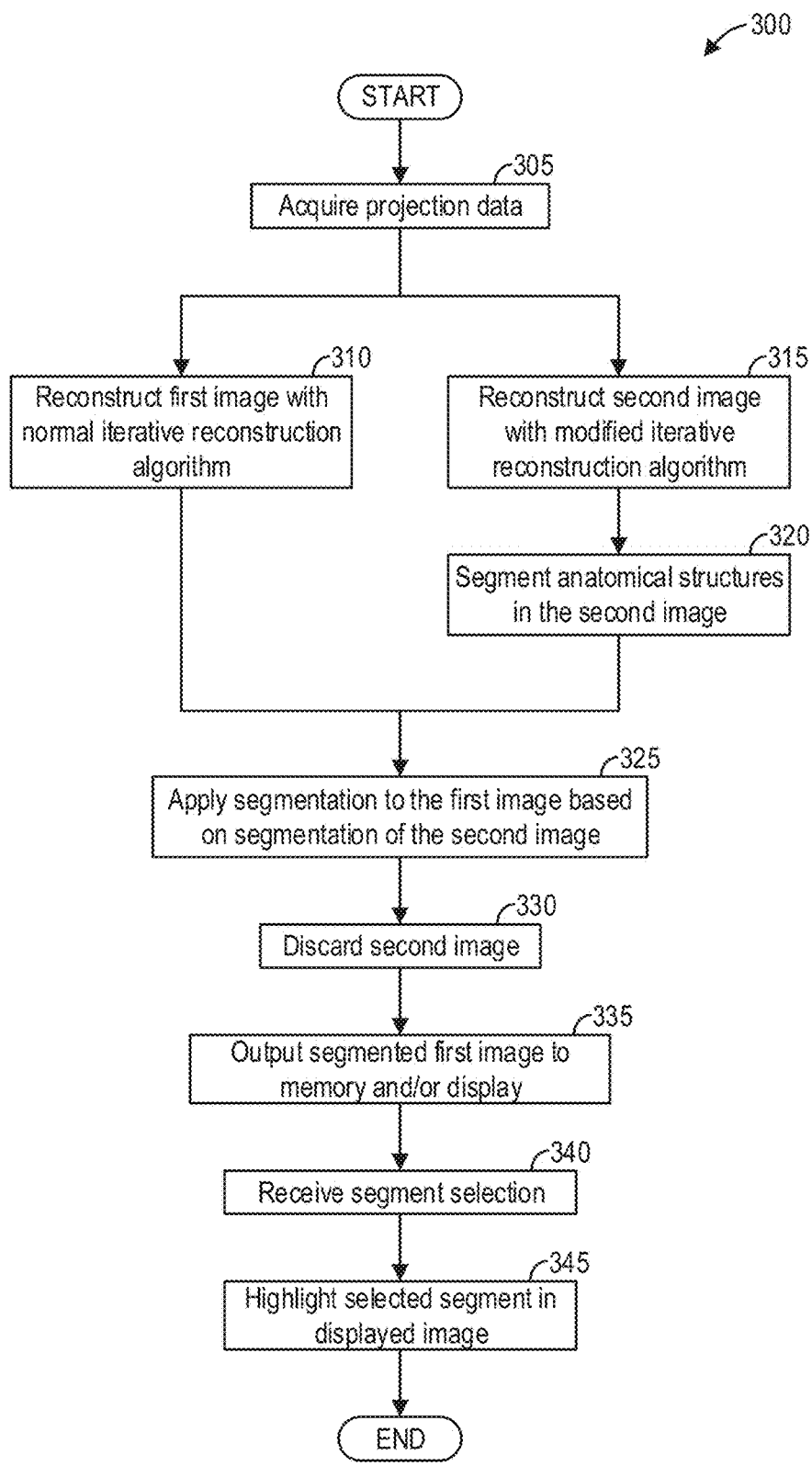
FIG. 3 shows a high-level flow chart illustrating an example method for generating an automatically segmented image according to an embodiment of the invention.

FIG. 3 shows a high-level flow chart illustrating an example method 300 for segmenting a reconstructed image according to an embodiment. In particular, method 300 relates to generating a pair of images from the same projection data, wherein a first image is reconstructed according to a normal iterative reconstruction algorithm and a second image is reconstructed according to a modified iterative reconstruction algorithm. The quality of the first image is suitable for diagnostics but not for automated segmentation, while the quality of the second image is not as suitable as the first image for diagnostics but is well-suited for automated segmentation. Method 300 may be carried out by the components and systems depicted in FIGS. 1 and 2, however it should be understood that the method may be implemented on other components and systems not depicted without departing from the scope of the present disclosure.

Method 300 may begin at 305. At 305, method 300 may include acquiring projection data. Projection data may be acquired over at least a half-scan rotation (180°+ fan angle) of the gantry 102. In some examples, acquiring the projection data may further include calibrating the projection data. Calibrating the projection data may include, but is not limited to, applying gain calibrations and adjustments to the projection data to prepare the projection data for image reconstruction. The acquired projection data may further include patient specific information such as organ-of-interests or suspected findings.

Method 300 may then proceed to 310. At 310, method 300 may include reconstructing a first image with a normal iterative reconstruction algorithm or a normal filtered back-projection (FBP) algorithm. In iterative reconstruction, an image is estimated by successively updating the image to find the solution which best matches the acquired data according to a model of the operation of the CT system. Exemplary iterative reconstruction algorithms which may be used to reconstruct the first image may include, but are not limited to, advanced statistical iterative reconstruction (ASIR), model-based iterative reconstruction (MBIR), and so on. In such exemplary iterative reconstruction algorithms, the image is reconstructed by minimizing a cost function such as:

$$\hat{x} = \arg \min_{x}\{L(Ax, y) + \alpha G(x)\},$$

where $\hat{x}$ represents the estimated object at the current iteration (i.e., the latest iteration of the image), x represents the estimated object at the previous iteration (i.e., the previous iteration of the image), A is a system matrix depicting the mapping process from the reconstructed image voxel to the projection (i.e., a linearized or nonlinear model of the imaging system), and y is the measured projection. The log-likelihood function $L(Ax,y)$ deals with the fidelity of the reconstructed image as compared to the original image by penalizing the differences between the image x and the projection data y, while the regularization function $G(x)$ deals with the neighborhood smoothness of the reconstructed images.

At 315, method 300 may include reconstructing a second image with a modified iterative reconstruction algorithm. In particular, the modified iterative reconstruction algorithm comprises the iterative reconstruction algorithm employed at 310 with various modifications that prioritize smoothness of the reconstructed image over accuracy of textural details. As a result, intensity fluctuations in the second image may be substantially reduced or eliminated altogether, and so the second image may be relatively smooth and flat compared to the first image. To that end, the iterative reconstruction algorithm utilized at 310 may be modified such that:

$$\hat{x} = \arg \min_{x}\{\beta_i \cdot L(A''x, y'') + \alpha_i \cdot G'(\tilde{x})\},$$

where A" is a modified system matrix, y" is a modified projection measurement, and the new parameters $\alpha_i$ and $\beta_i$ are dependent on the iteration index i. In addition, i and i may be dependent on a priori information of the patient such as organ-of-interests. For example, the value of i and i may be significantly different for the segmentation of liver and brain. In this equation, the regularization function G' can be substantially different from the function G used to reconstruct the first image. It should also be noted that the variable $G'(\tilde{x})$ indicates that the definition of "neighborhood" for regularization can be significantly different from the traditional regularization term. In particular, the "neighborhood" can be defined by a small "connected region" that share similar characteristics and does not need to be limited to "regular shape". For example, the neighborhood region near the upper edge of a liver can have a dome shape at the top and flat sides. All voxels inside the neighborhood have CT values within a given range. Note that the log-likelihood function $L(Ax,y)$ is modified to $L(A''x,y'')$, where the modified system matrix A" deprioritizes spatial resolution. Each new voxel corresponds to a bigger area as compared to the original image, and the same is applicable to the projection samples (i.e., each sample covers an area larger than the detector cell). The parameter $\alpha_i$ is significantly increased as compared to the normal iterative reconstruction process so that the image smoothness (i.e., the regularization function) becomes the more dominating factor compared to the log-likelihood function. The parameter $\alpha_i$ is also iteration-dependent together with the parameter $\beta_i$. In order to fully prioritize image smoothness, the parameter $\beta_i$ may generally be zero with only an occasional non-zero value. In other words, additional iterations may be rendered on the image regularization under the constraint to ensure the noise-induced intensity fluctuation is reduced to a minimum. In an extreme case, the parameter $\beta_i$ may be zero for all iterations i such that only image-space regularization is performed. Further, a smoothing constraint is imposed on each iteration with respect to the initial iteration:

$$\|F(x)-F(x_0)\| \leq \varepsilon,$$

where F is a smoothing function and $\varepsilon$ is a constraint parameter. The smoothing function F ensures that the average of x in the small neighborhood is approximately (i.e., up to a difference of $\varepsilon$) the same as the average of the original estimation of the object $x_0$.

The proposed algorithm may be further connected to the segmentation algorithm and the reconstruction parameters may be dynamically adjusted based on the feedback from the segmentation algorithm, as described further herein below with regard to FIG. 7. The segmentation algorithm may judge the acceptance level of the output based on different criteria. For example, if the goal is to segment the entire liver, it can compare the output against known liver shape, adjacency to other anatomies, and volume. If there is a significant difference between the expected output and the actual output, the parameters of reconstruction will be modified and the reconstruction of the second image will be repeated. The loop will continue until the criteria are met.

The above describes a fully automated process. It should be known that human intervention can also be used in the process. For example, an initial segmented result can be presented to a human operator. If there are significant region(s) missing, the operator can plant a "seed" at the missing region and the reconstruction algorithm will modify the parameters to ensure that the missing regions will be modified such that they will be included by the segmentation algorithm.

FIGS. 4 and 5 show example images of an abdomen reconstructed from the same scan data using a normal iterative reconstruction algorithm and a modified iterative reconstruction algorithm, respectively. In particular, FIG. 4 shows an example image 400 reconstructed using the normal iterative reconstruction algorithm described at 310, and FIG. 5 shows an example image 500 reconstructed using the modified iterative reconstruction algorithm described at 315. Specifically, image 400 is reconstructed using ASIR while image 500 is reconstructed using modified ASIR. Comparing the two images, the flatness of the reconstructed image 500 in relatively flat anatomies may be nearly noise free compared to the reconstructed image 400. The intensity across the anatomical structures in image 500 is nearly constant, removing all fluctuations in the intensity. The intensity fluctuations across the anatomical structures in image 400 poses technical issues for automatic segmentation, and may result in incorrectly segmented organs and other structures within the image 400. In contrast, the constant intensity of each anatomical structure in image 500 is ideal for automatic segmentation.

Returning to FIG. 3, after the second image is reconstructed at 310, method 300 may continue to 320. At 320, method 300 may include segmenting the anatomical structures in the second image. Image segmentation comprises partitioning an image into a plurality of segments, each segment containing a plurality of voxels. As the second image includes a minimal amount of intensity fluctuations and noise, any suitable automatic segmentation process may be applied to the second image to obtain accurate segments. In one example, a simple threshold segmentation process may be applied to the second image. For example, a suitable threshold image segmentation process may include clustering, edge detection, histogram-based methods, entropy-based methods, local threshold methods, spatial methods, attribute methods, and so on.

At 325, method 300 may include applying segmentation to the first image based on the segmentation of the second image. In particular, applying segmentation to the first image does not comprise applying an automatic segmentation process to the first image. Rather, the first image may be segmented according to the segmentation of the second image. For example, the segments obtained during automatic segmentation of the second image may be applied to the first image such that the first image is segmented according to the segmentation of the second image. In one example, applying segmentation to the first image may comprise applying the boundaries obtained in segmenting the second image to the first image. In another example, applying segmentation to the first image may comprise applying the voxel index obtained in segmenting the second image to the first image. In this way, the first image may be segmented regardless of the image quality of the first image, which may otherwise negatively affect any automatic segmentation applied to the first image.

After the segmentation of the second image is applied to the first image, the second image may be discarded. Thus, continuing at 330, method 300 may include discarding the second image and associated data. In this way, memory usage may be reduced.

In some examples, the image matrix size of the second image may not be identical to the first image. For example, the first image may be reconstructed with an image matrix size of 512 by 512 while the second image may be 256 by 256. By reducing the size of the second image, the computational complexity can be reduced.

In some examples, the reconstruction of the second image may use the first image as the initial condition. That is, in the iterative reconstruction process, the second image starts with the first image as the initial condition and iterate until the conditions are met. This will help to reduce the computational complexity.

At 335, method 300 may include outputting the segmented first image to memory and/or a display for review. For example, the segmented first image may be stored in memory, such as the mass storage 218, for retrieval at a later time. Additionally or alternatively, the segmented image may be output to a display, such as display 232, for display to a user of the imaging system 200, such as a radiologist or physician.

In some embodiments of the present invention, a dual-energy or multi-energy mode of data acquisition may be used. The first image can be reconstructed with one energy and the second image can be reconstructed with a different energy. For example, the first image may comprise a monochromatic-energy image reconstructed at 70 keV while the second image may comprise a monochromatic-energy image reconstructed at 200 keV image. The higher energy image (e.g., 200 keV) does not contain anatomical details and is readily segmented with simple segmentation method, while the low-energy image (70 keV) contains sufficient anatomical details for diagnosis. The reconstruction process used for the first and the second image generation can be similar or significantly different. For example, the first and second images may be generated using a same reconstruction algorithm. As another example, the first image may be generated using a reconstruction algorithm while the second image may be generated using a modified version of the same reconstruction algorithm in order to further improve segmentation of the second image.

In another embodiment, the first image may be a monochromatic image and the second image may be a material-density image. Segmentation is performed on the material-density image and the final segmentation results can be ported to the monochromatic image. Alternatively, the first image may be a material-density image and the second image may be a monochromatic image, and the segmentation performed on the monochromatic image can be ported to the material-density image.

Continuing at 340, method 300 may include receiving a segment selection. A segment selection may comprise a selection of one or more segments of the plurality of segments in the segmented first image. In one example, the segment selection may be received from the operator console 220. For example, a user of the imaging system 200 may desire to highlight a particular segment of the image, and so may select the particular segment via the operator console 220. As an illustrative and non-limiting example, the user may select a segment associated with a tumor located in the image in order to emphasize the location of the tumor.

In another example, the segment selection may be automatically generated. For example, a machine learning algorithm (e.g., a classification algorithm) may be applied to the segmented first image to automatically identify an atypical segment. To that end, such a machine learning algorithm may identify segments associated with anatomical structures expected in the image, and may return any segments which are not associated with standard anatomical structures. Therefore, in such an example, the segment selection may be generated by and received from the computer 216 itself.

At 345, method 300 may include highlighting the selected segment in the displayed image. Highlighting the selected segment may comprise any suitable method of emphasizing the selected segment to the user. For example, highlighting the selected segment may comprise applying a color to the boundary of the selected segment. As another example, highlighting the selected segment may comprise reducing the brightness of the entire image aside from the selected segment while maintaining the original brightness of the selected segment. In this way, the selected segment may be easily identified by a user amongst unselected segments. Method 300 may then end.

Thus, a method comprises generating a first image from acquired projection data based on a reconstruction algorithm, generating a second image from the acquired projection data based on a modified iterative reconstruction algorithm, segmenting the second image to obtain segments, segmenting the first image based on the segments of the second image, and outputting the segmented first image to a display.

Figure 6:
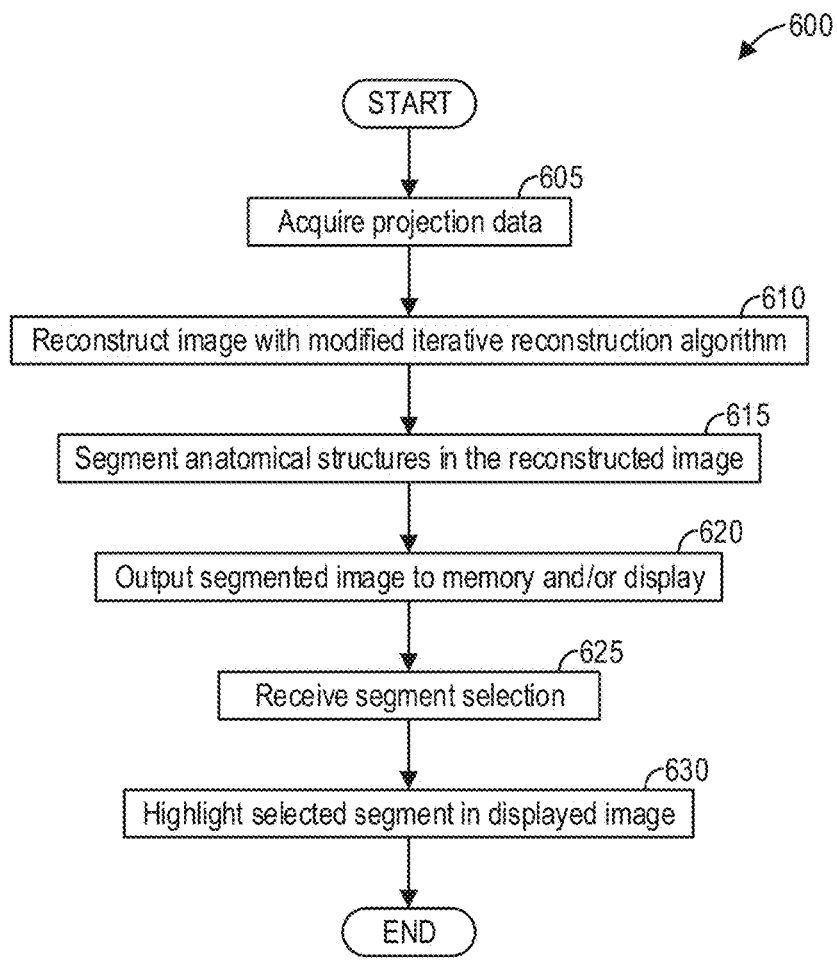
FIG. 6 shows a high-level flow chart illustrating an example method for generating an automatically segmented image according to an embodiment of the invention.

FIG. 6 shows a high-level flow chart illustrating an example method 600 for generating a segmented image. In particular, method 600 relates to reconstructing an image with a modified iterative reconstruction algorithm, wherein the modifications to the algorithm enable an automatic segmentation algorithm to correctly segment structures within the image. In some examples, the segmentation of an image may be a greater priority than the textural details obtained using a normal iterative reconstruction algorithm. For example, the image 500 reconstructed for automatic segmentation may be sufficient for the purposes of an oncologist, who may not find the additional detail of the image 400 particularly useful. To that end, method 600 does not include the reconstruction of a second image using a normal or unmodified iterative reconstruction algorithm. Method 600 may be carried out by the components and systems depicted in FIGS. 1 and 2, however it should be understood that the method may be implemented on other components and systems not depicted without departing from the scope of the present disclosure.

Method 600 may begin at 605. At 605, method 600 may include acquiring projection data. Projection data may be acquired over at least a half-scan rotation (180°+ fan angle) of the gantry 102. In some examples, acquiring the projection data may further include calibrating the projection data. Calibrating the projection data may include, but is not limited to, applying gain calibrations and adjustments to the projection data to prepare the projection data for image reconstruction.

At 610, method 600 may include reconstructing an image with a modified iterative reconstruction algorithm. The modified iterative reconstruction algorithm may be substantially similar to the modified iterative reconstruction algorithm described herein above at 315 with regard to FIG. 3. In particular, as described herein above, modifications to a normal iterative reconstruction algorithm may be designed to prioritize smoothness of the reconstructed image over accuracy of textural details.

At 615, method 600 may include segmenting anatomical structures in the reconstructed image. Image segmentation comprises partitioning an image into a plurality of segments, each segment containing a plurality of voxels. In one example, a simple threshold segmentation process may be applied to the second image. For example, a suitable threshold image segmentation process may include clustering, edge detection, histogram-based methods, entropy-based methods, local threshold methods, spatial methods, attribute methods, and so on.

It should be pointed out that a loop may exist between step 610 and 615 where the iterative reconstruction parameters are modified or updated based on the outcome of the step 615. This is similar to the process illustrated in FIG. 7. That is, if certain criteria are not met in the segmentation process of 615, the reconstruction parameters are modified and a new set of images are generated in 610. The new set of images is segmented in 615. The loops continues until the predefined criteria are met.

Continuing at 620, method 600 may include outputting the segmented image to memory and/or display. For example, the segmented image may be stored in memory, such as the mass storage 218, for retrieval at a later time. Additionally or alternatively, the segmented image may be output to a display, such as display 232, for display to a user of the imaging system 200, such as a radiologist or physician.

At 625, method 600 may include receiving a segment selection. A segment selection may comprise a selection of one or more segments of the plurality of segments in the segmented image. In one example, the segment selection may be received from the operator console 220. For example, a user of the imaging system 200 may desire to highlight a particular segment of the image, and so may select the particular segment via the operator console 220. As an illustrative and non-limiting example, the user may select a segment associated with a tumor located in the image in order to emphasize the location of the tumor.

In another example, the segment selection may be automatically generated. For example, a machine learning algorithm (e.g., a classification algorithm) may be applied to the segmented image to automatically identify an atypical segment. To that end, such a machine learning algorithm may identify segments associated with anatomical structures expected in the image, and may return any segments which are not associated with standard anatomical structures. Therefore, in such an example, the segment selection may be generated by and received from the computer 216 itself.

At 630, method 600 may include highlighting the selected segment in the displayed image. Highlighting the selected segment may comprise any suitable method of emphasizing the selected segment to the user. For example, highlighting the selected segment may comprise applying a color to the boundary of the selected segment. As another example, highlighting the selected segment may comprise reducing the brightness of the entire image aside from the selected segment while maintaining the original brightness of the selected segment. In this way, the selected segment may be easily identified by a user amongst unselected segments. Method 600 may then end.

Thus, a method comprises generating an image from acquired projection data based on a modified reconstruction algorithm, the modified reconstruction algorithm comprising a reconstruction algorithm with one or more modifications, segmenting the image, and outputting the segmented image to a display.

Figure 7:
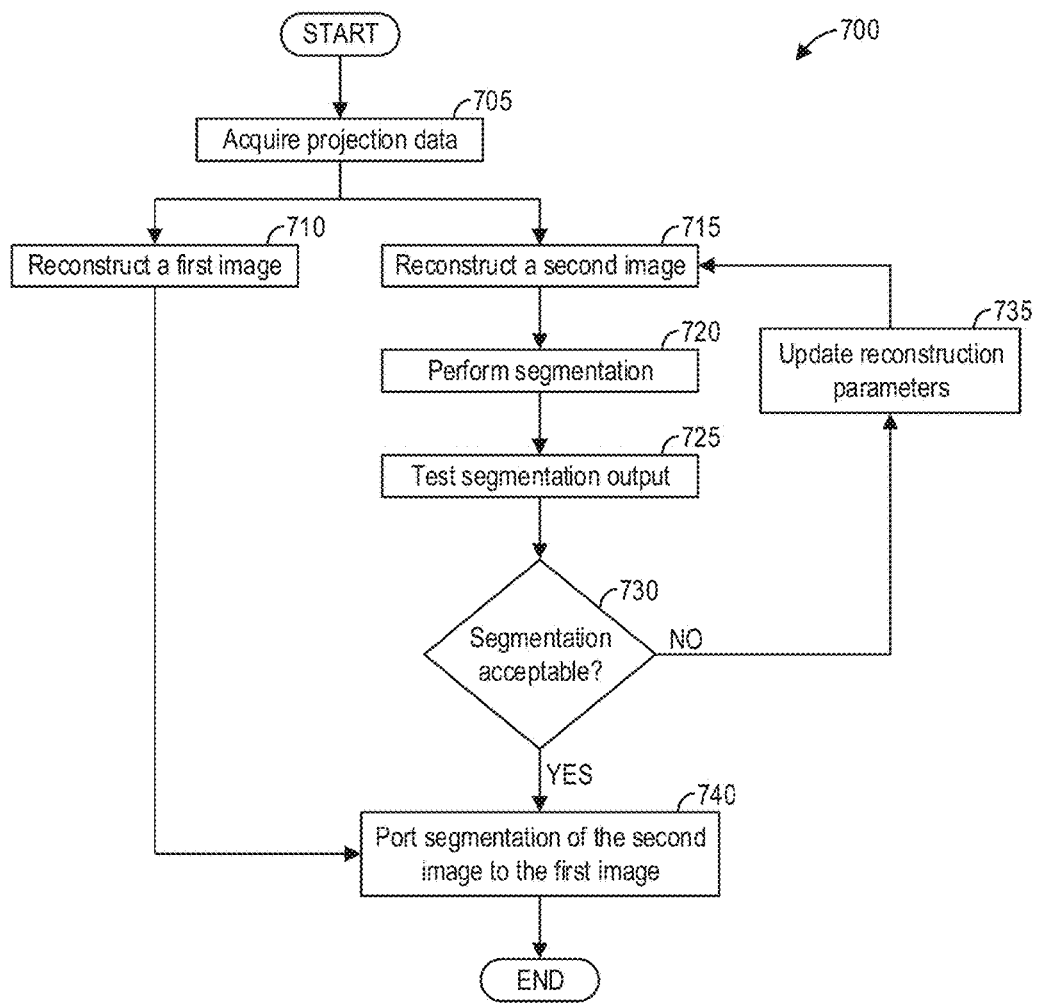
FIG. 7 shows a high-level flow chart illustrating an example method for generating an automatically segmented image according to an embodiment of the invention.

FIG. 7 shows a high-level flow chart illustrating an example method 700 for automatically segmenting an image according to an embodiment of the invention. In particular, method 700 relates to dynamically linking a reconstruction algorithm and a segmentation algorithm, such that feedback from the segmentation algorithm may be used to update the reconstruction algorithm. The modified image reconstruction described herein above may thus be iteratively improved to obtain a segmented image within a pre-specified accuracy range. Method 700 may be described with regard to the systems and components depicted in FIGS. 1-2, however it should be understood that the method may be carried out using other systems and components without departing from the scope of the disclosure.

Method 700 may begin at 705. At 705, method 700 may include acquiring projection data. In one example, the projection data may be acquired at a single acquisition energy. In another example, the projection data may be acquired at two or more acquisition energies, for example using a dual or multi-energy imaging system. In such an example, the projection data acquired may comprise a plurality of projection datasets. For example, for dual energy imaging, the projection data may comprise high energy projection data and low energy projection data.

At 710, method 700 may include reconstructing a first image. In examples where the projection data is acquired at a single acquisition energy, the first image may be reconstructed from the acquired projection data. In examples where the projection data includes high energy projection data and low energy projection data, the first image may be reconstructed from the low energy projection data. In examples where the projection data includes more than two sets of projection data (e.g., in multi-energy imaging wherein a highest energy projection dataset and a plurality of lower energy projection datasets are acquired), reconstructing the first image may comprise reconstructing a plurality of images, each image of the plurality of images corresponding each of the lower energy projection datasets.

Meanwhile, at 715, method 700 may include reconstructing a second image. In examples where the projection data is acquired at a single acquisition energy, the first image may be reconstructed from the acquired projection data using a modified reconstruction algorithm. In particular, the modified reconstruction algorithm may comprise the reconstruction algorithm used to reconstruct the first image at 710, with one or more modifications as described hereinabove. For example, the modified reconstruction algorithm may include one or more of a modified system matrix, constraint operators, and so on. In examples where the projection data is acquired at two or more energies, the second image may be reconstructed from the highest energy projection data.

At 720, method 700 may include performing segmentation on the second image. Performing segmentation on the second image may comprise, as a non-limiting example, using simple thresholding to segment the second image to obtain a plurality of segments.

At 725, method 700 may include testing the segmentation output. Testing the segmentation output, or the plurality of segments generated at 720, may comprise applying an acceptability test to the segmentation output in order to determine if the segmentation output is acceptable. In one example, the acceptability test may comprise determining if the segmentation output satisfies predetermined criteria. For example, if a particular organ is expected in the imaged volume (e.g., a liver, heart, stomach, kidney, etc.), the segmentation output may be compared against known organ shape, adjacency to other anatomies, and expected segment volumes. Since anatomies may vary from person to person, the acceptability test may comprise computing a difference between the expected segmentation output and the actual segmentation output. A difference greater than an acceptability threshold may indicate that the segmentation is not acceptable, while a difference less than the acceptability threshold may indicate that the segmentation is acceptable (at least within the acceptable threshold range).

At 730, method 700 may include determining if the segmentation output is acceptable. If the segmentation output is not acceptable, method 700 may continue to 735. At 735, method 700 may include updating the reconstruction parameters used to reconstruct the second image. In particular, the reconstruction parameters may be updated such that the second image reconstructed using the reconstruction parameters may be more correctly segmented. To that end, after updating the reconstruction parameters, method 700 may continue to 715, whereupon method 700 may reconstruct a second image using the updated reconstruction parameters. Method 700 may loop in this way until the segmentation output passes the acceptability test at 725. Although not depicted, in some examples, method 700 may include additional logic to terminate the loop if the acceptability of the segmentation output does not converge after a specified number of updates to the reconstruction parameters.

If the segmentation output is acceptable, method 700 may continue to 740. At 740, method 700 may include porting the segmentation of the second image to the first image. Porting the segmentation of the second image to the first image may comprise applying the segmentation output to the first image. Method 700 may then end.

In this way, a method for automatic segmentation may include a feedback loop to dynamically adjust reconstruction of a second images until segmentation of the second image is acceptable. While the method described above may be fully automated, it should be appreciated that in some examples, manual (i.e., human) intervention may also be included in the method. For example, an initial segmented result may be presented via a display to an operator of the imaging system. If significant region(s) are missing, the operator may indicate the missing region and the reconstruction algorithm will modify the parameters to ensure that the missing regions will be modified such that they will be included by the segmentation algorithm.

A technical effect of the disclosure is the modification of an iterative reconstruction algorithm to constrain intensity fluctuations in reconstructed images. Another technical effect of the disclosure is the reconstruction of images with constrained intensity fluctuations. Yet another technical effect of the disclosure is the automatic segmentation of an image reconstructed with constrained intensity fluctuations. Another technical effect of the disclosure is the display of a segmented image, wherein a particular segment selected by a user is highlighted in the displayed image. Another technical effect of the disclosure is the dynamic updating of reconstruction parameters for a reconstruction algorithm based on output from a segmentation algorithm.

In one embodiment, a method comprises generating a first image from acquired projection data, generating a second image from the acquired projection data based on a modified reconstruction algorithm, segmenting the second image to obtain segments, and segmenting the first image based on the segments of the second image. In some examples, the segmented first image may be output to a display.

In one example, the modified iterative reconstruction algorithm comprises an iterative reconstruction algorithm used to generate the first image with a modified system matrix. In some examples, the modified iterative reconstruction algorithm further comprises the iterative reconstruction algorithm with a modified projection. In yet another example, the modified iterative reconstruction algorithm includes a constraint operator configured to ensure that an average estimation of an object is within a threshold range of an original average estimation of the object.

In one example, the method further comprises discarding the second image after obtaining the segments. In this way, digital memory may be conserved.

In another example, the method further comprises receiving a selection of a segment and highlighting the selected segment in the segmented first image output to a display. For example, highlighting the selected segment comprises applying an outline to a boundary of the selected segment.

In yet another example, the method further comprises updating the modified reconstruction algorithm based on feedback from the segmentation of the second image. In this way, segmentation may be further improved.

As another example, segmenting the second image comprises applying a threshold segmentation to the second image. In one example, segmenting the first image comprises applying segment boundaries of the segments to the first image.

In another embodiment, a method comprises generating a first image from acquired projection data, generating a second image from the acquired projection data, segmenting the second image to generate segments, and segmenting the first image based on the segments of the second image. In some examples, the segmented first image is output to a display.

In one example, generating the second image comprises reconstructing the second image with a modified iterative reconstruction algorithm. In some examples, the modified iterative reconstruction algorithm includes a constraint operator configured to ensure that an average estimation of an object is within a threshold range of an original average estimation of the object.

In another example, segmenting the second image comprises applying a threshold segmentation to the second image.

As another example, the method further comprises receiving a selection of a segment of the segments and highlighting the selected segment in a segmented image output to a display.

In one example, the projection data comprises high energy projection data and low energy projection data. In such an example, generating the first image comprises reconstructing the first image from the low energy data, and generating the second image comprises reconstructing the second image from the high energy data.

In another example, the method further comprises applying an acceptability test to the segments of the second image. Responsive to the segments of the second image not passing the acceptability test, the method further comprises updating one or more reconstruction parameters, generating a third image based on the one or more updated reconstruction parameters, segmenting the third image to obtain updated segments, and segmenting the first image based on the updated segments of the third image. Otherwise, responsive to the segments of the second image passing the acceptability test, the method further comprises segmenting the first image based on the segments of the second image.

In yet another embodiment, a system comprises an x-ray source that emits a beam of x-rays toward an object to be imaged, a detector that receives the x-rays attenuated by the object, and a data acquisition system (DAS) operably connected to the detector. The system further comprises a computer operably connected to the DAS and configured with instructions in non-transitory memory that when executed cause the computer to generate, from projection data received from the DAS, a first image based on a reconstruction algorithm, generate, from the projection data, a second image based on a modified reconstruction algorithm, the modified reconstruction algorithm comprising the reconstruction algorithm with a modified system matrix, segment the second image into a plurality of segments, and segment the first image based on the plurality of segments from the second image.

In one example, the system further comprises a display, and the computer is further configured with instructions in the non-transitory memory that when executed cause the computer to output the segmented first image to the display.

In another example, the system further comprises an operator console operably connected to the computer and configured to receive user input, and the computer is further configured with instructions in the non-transitory memory that when executed cause the computer to receive a selection of at least one segment of the plurality of segments from the operator console, and highlight the at least one segment in the segmented first image output to the display.

In one example, the modified reconstruction algorithm further includes a modified projection. In another example, the modified reconstruction algorithm includes a constraint operator configured to ensure that an average estimation of an object is within a threshold range of an original average estimation of the object.

In one embodiment, a method comprises acquiring projection data, the projection data comprising higher energy projection data and lower energy projection data. The method further comprises generating a first image from the projection data, generating a second image from the projection data, segmenting the second image to generate segments, and segmenting the first image based on the segments of the second image. In one example, the first image is generated from the lower energy projection data, and the second image is generated from the higher energy projection data.

In one example, generating the second image comprises reconstructing the second image with a modified iterative reconstruction algorithm. As an example, the modified iterative reconstruction algorithm includes a constraint operator configured to ensure that an average estimation of an object is within a threshold range of an original average estimation of the object.

In another example, segmenting the second image comprises applying a threshold segmentation to the second image.

In yet another example, the method further comprises receiving a selection of a segment of the segments and highlighting the selected segment in a segmented image output to a display.

In another example, the method further comprises applying an acceptability test to the segments of the second image. Responsive to the segments of the second image not passing the acceptability test, the method further comprises updating one or more reconstruction parameters, generating a third image based on the one or more updated reconstruction parameters, segmenting the third image to obtain updated segments, and segmenting the first image based on the updated segments of the third image. Otherwise the method further comprises segmenting the first image based on the segments of the second image.

In another embodiment, a method comprises generating a first image from acquired projection data, generating a second image from the acquired projection data based on a modified reconstruction algorithm, segmenting the second image to obtain segments, and segmenting the first image based on the segments of the second image.

In one example, the modified reconstruction algorithm comprises a reconstruction algorithm used to generate the first image with a modified parameter. For example, the modified parameter may be a modified system matrix. In another example, the modified reconstruction algorithm further comprises the reconstruction algorithm with a modified projection. In yet another example, the modified reconstruction algorithm includes a constraint operator configured to ensure that an average estimation of an object is within a threshold range of an original average estimation of the object.

In another example, the method further comprises updating the modified reconstruction algorithm based on feedback from the segmentation of the second image. In such an example, the method further comprises generating a third image responsive to and based on the updated modified reconstruction algorithm, segmenting the third image to obtain updated segments, and segmenting the first image based on the updated segments of the third image.

In yet another example, segmenting the second image comprises applying a threshold segmentation to the second image. In some examples, the method further comprises discarding the second image after obtaining the segments. In one example, the method further comprises outputting the segmented first image to a display.

In yet another embodiment, a system comprises an x-ray source that emits a beam of x-rays toward an object to be imaged, a detector that receives the x-rays attenuated by the object, and a data acquisition system (DAS) operably connected to the detector. The system further comprises a computer operably connected to the DAS and configured with instructions in non-transitory memory that when executed cause the computer to: generate, from projection data received from the DAS, a first image based on a reconstruction algorithm; generate, from the projection data, a second image based on a modified reconstruction algorithm, the modified reconstruction algorithm comprising the reconstruction algorithm with one or more modifications; segment the second image into a plurality of segments; and segment the first image based on the plurality of segments from the second image.

In one example, the system further comprises a display, and the computer is further configured with instructions in the non-transitory memory that when executed cause the computer to output the segmented first image to the display.

In another example, the one or more modifications include one or more of a modified projection, a modified system matrix, and a constraint operator.

In yet another example, the computer is further configured with instructions in the non-transitory memory that when executed cause the computer to update one or more reconstruction parameters of the modified reconstruction algorithm responsive to and based on feedback from the segmentation of the second image.

In another example, the projection data acquired from the DAS comprises higher energy projection data and lower energy projection data, and the first image is generated from the lower energy projection data and the second image is generated from the higher energy projection data.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   acquiring projection data, the projection data comprising higher energy projection data and lower energy projection data, at each of the higher and lower energies;
   generating a first image from the lower energy projection data;
   generating a second image from the higher energy projection data;
   segmenting the second image to generate segments; and
   segmenting the first image based on the segments of the second image.

2. The method of claim 1, wherein generating the second image comprises reconstructing the second image with a modified iterative reconstruction algorithm.

3. The method of claim 2, wherein the modified iterative reconstruction algorithm includes a constraint operator configured to ensure that an average estimation of an object is within a threshold range of an original average estimation of the object.

4. The method of claim 1, wherein segmenting the second image comprises applying a threshold segmentation to the second image.

5. The method of claim 1, further comprising receiving a selection of a segment of the segments and highlighting the selected segment in a segmented image output to a display.

6. The method of claim 1, further comprising:
   applying an acceptability test to the segments of the second image;
   responsive to the segments of the second image not passing the acceptability test:
      updating one or more reconstruction parameters;
      generating a third image based on the one or more updated reconstruction parameters;
      segmenting the third image to obtain updated segments; and
      segmenting the first image based on the updated segments of the third image; and
   otherwise segmenting the first image based on the segments of the second image.

7. A method, comprising:
   generating a first image from lower energy projection data of acquired projection data;
   generating a second image from higher energy projection data of the acquired projection data based on a modified reconstruction algorithm;
   segmenting the second image to obtain segments; and
   segmenting the first image based on the segments of the second image.

8. The method of claim 7, wherein the modified reconstruction algorithm comprises a reconstruction algorithm used to generate the first image with a modified parameter.

9. The method of claim 7, wherein the modified reconstruction algorithm further comprises a reconstruction algorithm with a modified projection.

10. The method of claim 7, wherein the modified reconstruction algorithm includes a constraint operator configured to ensure that an average estimation of an object is within a threshold range of an original average estimation of the object.

11. The method of claim 7, further comprising updating the modified reconstruction algorithm based on feedback from the segmentation of the second image.

12. The method of claim 11, further comprising generating a third image responsive to and based on the updated modified reconstruction algorithm, segmenting the third image to obtain updated segments, and segmenting the first image based on the updated segments of the third image.

13. The method of claim 7, wherein segmenting the second image comprises applying a threshold segmentation to the second image.

14. The method of claim 7, further comprising discarding the second image after obtaining the segments.

15. The method of claim 7, further comprising outputting the segmented first image to a display.

16. A system, comprising:
an x-ray source that emits a beam of x-rays toward an object to be imaged;
a detector that receives the x-rays attenuated by the object;
a data acquisition system (DAS) operably connected to the detector; and
a computer operably connected to the DAS and configured with instructions in non-transitory memory that, when executed, cause the computer to:
generate, from projection data received from the DAS, a first image based on a reconstruction algorithm;
generate, from the projection data, a second image based on a modified reconstruction algorithm, the modified reconstruction algorithm comprising the reconstruction algorithm with one or more modifications;
segment the second image into a plurality of segments; and
segment the first image based on the plurality of segments of the second image;
wherein the projection data acquired from the DAS comprises higher energy projection data and lower energy projection data, and wherein the first image is generated from the lower energy projection data and the second image is generated from the higher energy projection data.

17. The system of claim 16, further comprising a display, and wherein the computer is further configured with instructions in the non-transitory memory that, when executed, cause the computer to output the segmented first image to the display.

18. The system of claim 16, wherein the one or more modifications include one or more of a modified projection, a modified system matrix, and a constraint operator.

19. The system of claim 16, wherein the computer is further configured with instructions in the non-transitory memory that, when executed, cause the computer to update one or more reconstruction parameters of the modified reconstruction algorithm responsive to and based on feedback from the segmentation of the second image.

20. The method of claim 1, wherein segmenting the first image based on the segments of the second image comprises applying boundaries of the segments to the first image.

* * * * *